United States Patent
Cuenoud et al.

[15] 3,693,549
[45] Sept. 26, 1972

[54] CONVEYORS

[72] Inventors: Gerard Cuenoud; Roland Addoutte, Geneva, Switzerland

[73] Assignee: Dunlop Holdings Limited, London, England

[22] Filed: Nov. 9, 1970

[21] Appl. No.: 87,711

[30] Foreign Application Priority Data

Nov. 28, 1969   Switzerland............17754/69
Sept. 9, 1970   Great Britain..........43,051/70

[52] U.S. Cl....................................104/25, 198/110
[51] Int. Cl.............................................B65g 15/22
[58] Field of Search..................104/18, 25, 148 LM; 198/16 MS, 198/110

[56] References Cited

UNITED STATES PATENTS

| | | |
|---|---|---|
| 3,238,893 | 3/1966 | Zuppiger......................104/25 |
| 2,404,984 | 7/1946 | Powers................104/148 LM |
| 3,594,622 | 7/1971 | Inagaki...............104/148 LM |
| 3,246,608 | 4/1966 | Cooper...................104/23 FS |
| 3,585,939 | 6/1971 | Laithwaite..........104/148 LM |

*Primary Examiner*—Gerald M. Forlenza
*Assistant Examiner*—D. W. Keen
*Attorney*—Stevens, Davis, Miller & Mosher

[57] ABSTRACT

A conveyor for passengers and/or freight, formed from a plurality of platforms, the conveyor having high speed and low speed sections joined by variable speed sections. The variation in speed is obtained by relative lateral sliding of the platforms, and the platforms are driven in the variable speed sections by linear motors and speed control is imposed on the exit from the variable speed zones, of which the following is a specification.

13 Claims, 8 Drawing Figures

CONVEYORS

This invention relates to conveyors, for passengers and/or freight, and in particular to conveyors comprising a plurality of platforms, a conveyor including a section in which the platforms move laterally relative to each other on a path defined by guide means whereby a speed variation is obtained.

Such conveyors can be used as main transport conveyors comprising an entrance position followed by a speed increasing section in which acceleration occurs up to the predetermined conveying speed for the main portion of the conveyor. The main portion is followed by a deceleration section and an exit position. The conveyor recirculates back to the entrance position and may or may not act as conveyor for the return run.

Alternatively such conveyors may be used as loading and/or unloading conveyors for a main conveyor running continuously at a predetermined relatively high speed. One conveyor may provide both loading and unloading facilities and comprise an entrance position, an acceleration section, a constance speed section running adjacent to the main conveyor and at a speed compatable with the speed of the main conveyor, a deceleration section and an exit position. The passenger and/or freight transfer to and from the main conveyor at the constant speed section of the loading and unloading conveyor. Instead of a conveyor serving for both loading and unloading, separate conveyors may be used, one for loading and one for unloading.

The platforms forming a conveyor may be of varying forms, typically being of elongated plan form, the long sides of the adjacent platforms being in relative laterally sliding relationship. However, other shapes of platforms can be used.

In operation, the platforms slide laterally, relative to one another, and also travel along a path defined by the guide means, in the speed change section of the conveyor. The path, in the variable speed section, is usually curved, but is not necessarily so. For various reasons, for example to reduce sliding friction between platforms, it is desirable to drive the platforms individually in the speed change, i.e. acceleration or deceleration, sections. As the speed of the platforms is changing however, the provision of a mechanical drive presents problems. One proposal is to use variable pitch helical screws, another proposal is to use a series of helicoidal gear wheels having an increasing diameter from one face to the other. Both these proposals are relatively complex, difficult and expensive to manufacture, and do not provide a satisfactory drive once wear occurs.

In the present invention it is proposed to use a plurality of electric linear induction motors positioned along the path of the platforms, at least in the speed change section, the linear motors arranged to provide thrusts on the platforms which, at any particular instance, act substantially tangential to the path of the platforms. The thrust of each linear motor, in combination with the reaction of the guide means or the platforms, produces a resultant thrust in a direction parallel to the direction of relative sliding of the platforms, to accelerate or decelerate the platforms to the desired exit speed.

In accordance with the present invention there is provided a conveyor having a plurality of sections, including at least one section wherein a speed variation is obtained, the conveyor comprising: a plurality of platforms, guide means for guiding the platforms through the variable speed section, a plurality of linear motors for driving the platforms through the variable speed section, and speed control means for controlling the speed of the platforms at the exit end of the variable speed section.

The invention will be readily understood from the following description of a particular embodiment, by way of example only, together with certain modifications thereto, in conjunction with the accompanying diagrammatic drawings, in which.

Figure 1:
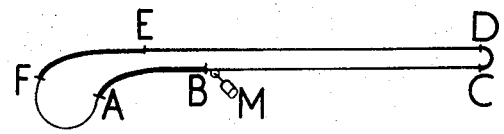
FIG. 1 is a view showing the circuit followed by platforms of a conveyor.

The illustrated conveyor, of which only the circuit is shown in FIG. 1, is more particularly intended for providing acceleration to passengers, by virtue of moving platforms, up to a speed $V_1$ corresponding to the speed of travel of a transporting belt 10 (FIG. 2) travelling at this same speed and to which the passengers are to be able to transfer to readily, their speed relative to that of the belt having become zero.

To this end, the circuit of the conveyor comprises four sections:

a. a section for accelerating passengers, from a minimum speed $V_0$ to the speed $V_1$, which lies between points A and B of the circuit, b. a section of constant speed $V_1$ which comprises portions BC-CD and DE of the circuit, c. a section of deceleration from speed $V_1$ to speed $V_0$ which lies between points E and F of the circuit, d. a section of constant speed $V_0$, intermediate the above mentioned deceleration and acceleration sections, (between points F and A).

The passengers step on to the conveyor at Point A of the circuit and step off it to pass on to the belt, as they wish and according to the room available on the belt, between points B and C, that is to say along the section of maximum speed $V_1$.

The other portions and sections of the circuit are exclusively intended for the recovery of platforms leaving section B–C, which platforms are continually brought back to the end A of the acceleration section so that the platforms moving along this section and along sections B–C form a continuous band of moving platforms.

The platforms in section A–B and B–C move in substantially the same plane as that of the belt. The platforms of portions C–D and D–E and of sections E–F and F–A usually move at a level below that of this plane, beneath a suitable protective surface.

The drive of the platforms along section B–C, D–E, E–F and F–A is, in the present example, provided by a motor M, acting on the first platforms of section B–C–D–E, as will be described below, with each platform of this section pushing the following one, the platforms being in contact with one another. The same applies to the platforms of the deceleration section E–F which are pushed as they enter this section by the platforms of portion D–E and which are braked by any suitable means, for example shoes acting on their ends, whereby their speed, which was equal to $V_1$, upon entering section E–F, falls to a value $V_0$ upon leaving this section.

The platforms leaving this section E–F travel along section F–A at the speed $V_0$, also in contact with one another, and pass into the acceleration section A–B at this speed.

Figure 2:
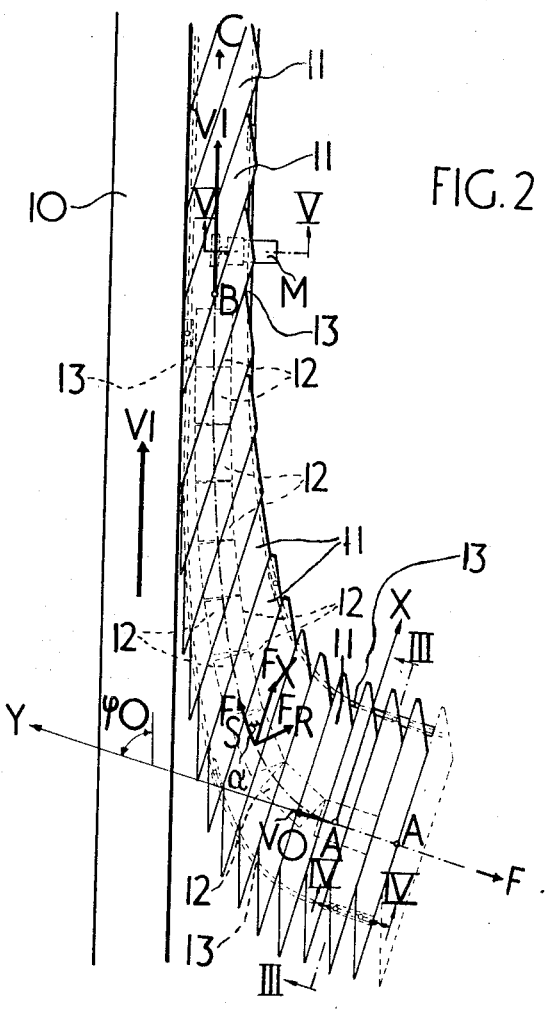
FIG. 2 is a plan view of the acceleration section of the circuit of FIG. 1.

In FIG. 2, A and B of the FIG. 1 circuit, correspond respectively to the entry end and to the exit end of the platform acceleration section; the platforms 11 arrive at A, as described, at a speed $V_0$ whose direction is perpendicular to their long edges, and is the direction of the axis Y passing through point A, and leave this section at B, at a speed $V_1$ substantially equal to that of travel of the transporting belt 10 and whose direction forms with the axis Y an angle $\phi$, such that:

$$\cos \phi = V_0/V_1$$

The acceleration may be at a constant value, or may vary. For passengers it is possible that a constant rate of acceleration is desirable, although it could also be arranged that there is a low rate of acceleration at the beginning of the acceleration section, with an increasing rate of acceleration for part of or all of the remainder of the section. The rate of acceleration may be decreased for the last part of the acceleration section. It is appreciated that the requirements for passengers and for freight are likely to differ.

It is desirable that the platforms 11 remain substantially in contact with one another along their longitudinal edges, during the acceleration section. While means may be provided, and normally are provided, to lock the platforms together while permitting relative lateral sliding, it is desirable that these locking means are not relied upon completely. For example, high frictional resistances to lateral sliding could occur. Thus it is desirable that the platforms be given a movement, and have a thrust applied to give this movement, which tends to maintain the longitudinal edges of the platforms in contact. That is, it is desirable to give the platforms a movement in the direction normal to the longitudinal axes of the platforms.

The initial movement of the platforms 11 at the entry to an acceleration section is wholly in a direction normal to the longitudinal axes of the platforms. At the exit from the acceleration section the direction of movement of the platforms 11 is at an angle to the longitudinal axes of the platforms. This change in direction is obtained by the lateral sliding of the platforms relative to each other in a direction parallel to the longitudinal axes, in the acceleration zone. The combination of movement in the direction normal to the longitudinal axes and the movement in the direction parallel to the longitudinal axes produces a resultant path of travel which is a curve, the shape of the curve depending upon the relative values of the two movements. After exit from the acceleration section, and travelling in the constant speed high speed section, there is no relative sliding between platforms, but it will be seen that the actual direction of movement can be resolved into two components, one normal and one parallel to the longitudinal axes of the platforms, and the component normal to the longitudinal axes will be equal to the original movement of the platforms at the entry to the acceleration section.

Linear motor stators 12 are positioned below the platforms 11, arranged to apply a thrust $Fs$ to each platform which thrust at any instant is tangential to the curve of the path of the platforms, or substantially so. Therefore, the thrust $Fs$ is at that instant parallel to the actual direction of movement of the platforms. This thrust can be resolved into two components, one normal to the applied thrust and being reacted against by guide means 13 by a force $Fr$, the other component $Fx$ parallel to the longitudinal axes of the platform urging the platforms to slide relative to one another.

The number and disposition of the stators 12 may vary. For example they may be end-to-end, substantially in contact as illustrated in FIG. 2, or spaced apart, the requirements being that they preferably produce a thrust which is tangential to the path of travel of the platforms 11. It is also preferable that the platforms are constructed so that the thrust will pass through the center of gravity of the platform when loaded, although this may not be achieved in actual operation as the loading on the platforms, i.e. passengers and/or freight, may not be distributed evenly about the mechanical center of gravity of the platform.

The linear motors are designed to have a relatively flat operating curve for that part which covers the operating range, thus producing a thrust which varies only slightly with variations in speed of the platforms. The final, or exit speed of the platforms from the acceleration section is controlled by a separate driving device for example an electric motor driving a friction drive device as at M in FIGS. 2 and 5. The driving device M acts to maintain a desired speed at the exit of the acceleration section, and thus the total acceleration through the acceleration section is controlled and the rate of acceleration at any instant is governed by the path followed, this path being defined by the guide means 13.

To reduce complexity, the linear motors 2 ideally would have similar constructional features, that is, the supply voltage and frequency the same for each motor, and each motor of similar design, for example, having the same pole pitch and numbers of turns. However, it is possible to vary one or more of these features, although the use of a supply having the same characteristics for each motor will avoid many difficulties and reduce expense.

Normally, the linear motors will tend to produce more thrust than is necessary for the acceleration of the platforms, but with the exit speed controlled by a separate means, each platform will control the preceding platform. By being designed to have a substantially flat operating curve, the linear motors will operate satisfactory without the production of undesirable thrust loads on the platforms.

Figure 3:
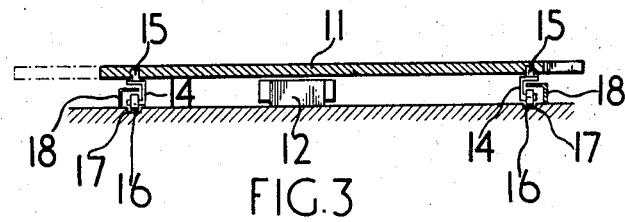
FIGS. 3, 4 and 5 are sections on FIG. 2, respectively along the lines III—III, IV—IV and V—V.
Figure 4:
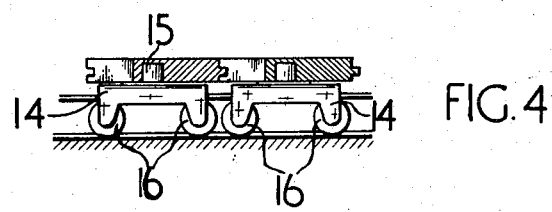

FIG. 3 illustrates, in vertical cross-section, one form of support and guidance for the platforms, and the position of a linear motor stator 12. Platforms 11 are supported on bogies 14 seen in more detail in FIG. 4. The platforms 11 are attached to the bogies 14 by a cylindrical spigot 15, fitting in a cylindrical recess formed in the platforms 11. The bogies 14 have wheels 16 which run in grooves 17 in a supporting structure, the grooves forming guide recesses which define the path of the platforms 11. Angle members 18 are provided for preventing the bogies moving out of engagement with the grooves 17.

Other forms of support, and guidance, of the platforms 11 can be used, including rails.

Figure 5:
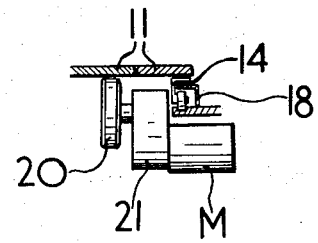

FIG. 5 illustrates an arrangement for the driving of the platforms in the high speed section BC (FIG. 1). The motor M drives a roller 20, which conveniently may be a rubber tired wheel, through suitable gearing 21.

In the illustrated embodiment, the platforms 11 are in a material which is amagnetic but electrically conductive, for example aluminum or an alloy of aluminum.

As will be seen, this particular composition for the plates is necessary in view of the method chosen for driving them in the acceleration section A–B (FIG. 1), the drive being produced by a series of asynchronous linear motors, comprising stators 12, the armatures consisting, for each motor, of a part of the platforms 11 passing within the range of their magnetic flux.

Figure 6:
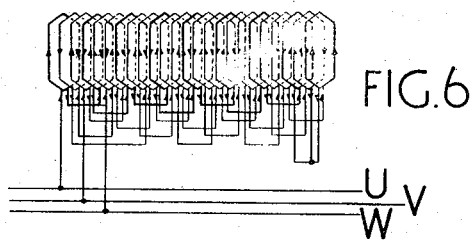
FIG. 6 illustrates a stator winding diagram for a linear motor for the conveyor.

FIG. 6 shows, by way of example, the winding diagram of one stator, star-connected and supplied by a three-phase supply U–V–W giving a current of frequency f, which is constant for all the asynchronous linear motors.

It will also be noted from FIGS. 2 and 3 that the stators 12 lie beneath the plane of movement of the platforms 11 and along the path of travel of the center of gravity of each platform 11, in a position such that their median longitudinal axes, in particular the midpoint of these axes, are tangential to this path of travel.

Thus, as the platforms progress in the acceleration section, the part of these platforms that is acted upon at any instant by the magnetic flux of each relevant stator will form the armature of the motors on which this magnetic flux will act to develop an electrodynamic thrust in a direction tangential to the path of travel.

It is not essential for the stators 12 to be arranged end-to-end as shown. Depending upon operating conditions it may be sufficient for each platform to be subjected to the magnetic flux of only one stator at any time throughout its movement in the acceleration section.

Moreover, the platforms can, by way of variant, be formed of a material which is magnetizable and electrically conductive, for example whenever it is desired to exert a given magnetic attraction on the platforms, particularly to improve their vertical stability.

According to another variant, the platforms could have a surface of electrically conductive, whether amagnetic or magnetizable, material only on the portions thereof that are in effect acted upon by the magnetic fields or the different stators.

According to still another variant, the platforms could be of an electrically non-conductive material, for example wood or synthetic material, and bear a plate of conductive material, magnetic or not as required, this plate being intended to constitute part of the short-circuit armature of each asynchronous linear motor of the acceleration section.

In such a case, however, it is desirable that this plate is disposed and formed in such a way that the electrodynamic thrust to which it is subjected by the different stators will pass substantially through the center of gravity of the relevant platform and in a direction tangential to the path of travel followed by this center of gravity during movement of the platform in the acceleration section.

In the case of a normal asynchronous motor, the speed of rotation of the rotor depends exclusively on the frequency of the supply current, on the number of poles of this motor, and on the load.

In a very general way, this speed of rotation of defined by the relationship $$n = n_s(1 - \sigma)$$

in which $n_s$ is the synchronous speed, i.e. the speed of the rotating field, and $\sigma$ is the "slip".

In the case of an asynchronous linear motor, the speed of travel of the armature can be expressed in an analogous manner $V = V_s(1 - \sigma)$ in which $V_s$ is the synchronous speed, in meters/second for example, which is equal to $$V_s = 2 \cdot \tau \cdot f$$

$\tau$ being the distance in meters corresponding to the pole pitch, i.e. that separating two poles of opposite polarity in the stator winding.

In conformity with what occurs in a rotating asynchronous motor, the slip of an asynchronous linear motor depends exclusively on the load on the motor, i.e. on the value of its losses and of the resistive forces opposing the armature being driven forward.

The asynchronous linear motors of the transporting apparatus according to the invention must be able not only to develop the power needed to overcome the resistive forces opposing the progression of the platforms along the circuit, but also that for accelerating these platforms in the manner indicated while they move at a well-defined speed, which is a function of their instantaneous position along the path of travel.

Because of the changing directional relationship between the longitudinal axis of the platforms and the path of travel, and also because of the change in speed along the path of travel, in the acceleration section, the thrust required from each linear motor will be different.

Figure 7:
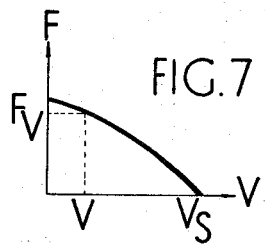
FIG. 7 is a curve illustrating the thrust-speed characteristic of a motor.

FIG. 7 shows the shape of the thrust-speed characteristic of an asynchronous linear motor of the kind used in the apparatus described, and whose winding would correspond for example to the one for which a diagram is shown in FIG. 6. A single type of stator could not provide the varying thrusts required if it is supplied with current having a frequency and a voltage which are constant from stator to stator. It is possible to adapt, for example, the supply voltage stators of the same type. By way of variant, stators could also be chosen whose structural peculiarities, such as pole pitch, numbers of turns, etc., would be such that the thrust-speed characteristic of each stator will satisfy the differing thrust requirements.

The speed of movement of the platforms in the acceleration section is controlled by controlling the speed at their exit from the latter by having the motor M mentioned above acting on the first platform 11 of the high speed section B–C, as by the speed-reducing gear 21 and wheel 22, in contact with the underside of platform 11.

The motor M will preferably be an asynchronous motor whose developed force-speed of travel characteristic, related to the point of contact of the wheel 22 on the platforms 11, would be particularly steep for high speeds near to maximum value (synchronous speed).

Moreover, it is desirable that the characteristic should have been so chosen that the resultant of the force developed by the Motor M, of the resistive forces (due to friction, the inertia of the passes to be accelerated, etc.) opposing the progression of the platforms over the whole circuit, and of the resultant of the forces developed by the asynchronous linear motors, will be zero for a speed equal to $V_1$.

Figure 8:
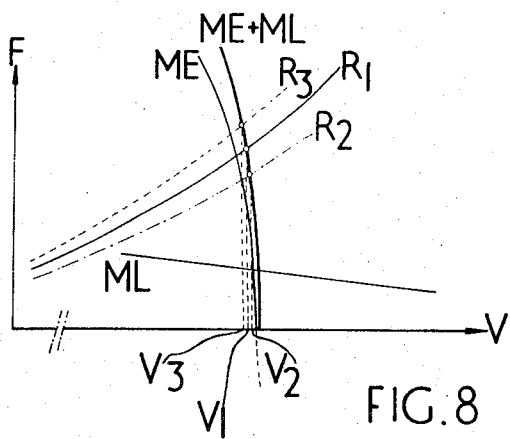
FIG. 8 is a series of curves illustrating the forces developed by the linear motor and the resistive forces of the platforms as a function of speed.

FIG. 8 shows by way of example, a diagram fulfilling the above conditions. The following in particular will be seen:

the curve ML of the resultant of the forces due the asynchronous linear motors as a function of speed;

the curve ME of the force developed by the motor M as a function of speed;

the curve $R_1$ which is that representing the resistive forces as a function of speed;

the combined curve ME + ML representing the total driving force acting along the circuit of the transporting apparatus described.

It will be seen that the curve ME + ML cuts curve $R_1$ at speed $V_1$.

It will also be seen that, taking into account the steepness of the curve ME and therefore of the curve ME+ML any lessening of the resistive forces $R_2$, for example during no-load operation of the transporting apparatus, only makes the speed of the platforms rise to a value V2 very close to $V_1$.

Similarly, any increase of the resistive forces (curve $R_3$) due for example to overloading the transporting apparatus, causes the speed of the platforms to drop to a value $V_3$, also very close to $V_1$.

In practice, it is convenient to choose the size of the motor M in such a way that the maximal variations in speed $$V_2 - V_1 = V_a \text{ and}$$

$$V_1 - V_3 = V_b$$

will be at most only of the order of a few percent of the speed $V_1$, in order that a user, carried along by the platforms of portions B–C, can easily pass on to the transporting belt 10 whose speed of travel is equal to $V_1$.

According to a variant embodiment, the motor M need not be an asynchronous motor, it being understood however that it will then be necessary to add thereto a speed regulator having a response curve similar to the curve ME of FIG. 8.

The platforms 11 travelling along the acceleration section are only in contact if they are driven along at a constant speed $V_0$ in the direction Ay. Moreover, they will only leave this section at a speed $V_1$ if they have been sufficiently accelerated in the direction Ax between points A and B of their path of travel. If this path is parabolic, the acceleration of the platforms will be constant between these points A and B.

Having the speed of the platforms leaving the acceleration section controlled by the motor M to impose a speed $V_1$ is equivalent to imposing the maximum speed of travel of the armature of the last asynchronous linear motor, and therefore to forcing this motor to exert on the armature a given thrust. The armature of the last linear motor will control in an analogous manner the armature of the preceding motor, which will have imposed thereon a mean speed of platform travel to which will correspond a given thrust on this armature.

By degrees, the armature of each linear motor will control in the same way the armature of the preceding linear motor, etc., up to the first asynchronous linear motor whose armature will move at a speed $V_0$ equal to that of the platforms along section F–A (FIGS. 1 and 2).

Thus, each platform of the acceleration section tends to hold back the platform occupying the preceding position by contact of the respective longitudinal edges, against the thrust exerted on the platforms by the action of the magnetic flux produced by the various stators 12.

It follows from the above that, along the last part of the section F–A, along the acceleration section A–B and along the portion B–C of the circuit followed by the platforms of the transporting apparatus described, the platforms are joined and form a continuous band of moving platforms on which users can move easily, in particular when they wish to step on to the transporting belt 10 in a zone other than that facing the platform they occupy along portion B–C.

According to a variant embodiment, not shown, the various platforms of the transporting apparatus according to the invention could be connected to one another, by forming on their longitudinal edges grooves and ribs having a section of dove-tail shape. In this way, it is possible not only to hold back the platforms of the acceleration section by the motor M, as described above, but also to exert, through this motor, a certain pull on one or more platforms of this section in the event of the overload of the platforms in question becoming such that their respective speeds would tend to become below that necessary and in particular below the value $V_3$ mentioned with reference to the diagram of FIG. 8.

More than one motor M is likely to be provided for the constant speed high speed section BC, to provide sufficient power to move the platforms 11 along this section. Generally all the motors will have the same operating characteristics as above described for motor M. Braking devices will also be provided for bringing the conveyor to a stop, as in an emergency. Such devices may be incorporated with the wheels 20, or be separate. Driving devices may also be provided for the section DE, and linear motors may also be provided for the deceleration section EF.

While the invention has been particularly described, and illustrated, by an embodiment in which the main high speed conveyor is fed by a variable speed conveyor in accordance with the present invention, it will readily be understood that an arrangement as described, and illustrated in the drawings, can be used to off-load a main conveyor, the main conveyor and the variable speed conveyor moving in a direction reverse to that shown for the embodiment described.

Further, a variable speed conveyor in accordance with the present invention can be used as a conveyor on its own. In such an example the constant speed high speed section BC will extend for the length required, and will then be followed by a deceleration section which is the reverse of the acceleration section AB. The exit from the deceleration section and the entry to the acceleration section will be connected by a constant speed low speed section.

Having now described our invention, what we claim is:

1. A conveyor having a plurality of sections, including at least one section wherein a speed variation is obtained, the conveyor comprising:
   a plurality of platforms;
   guide means for guiding the platforms through the variable speed section;
   a plurality of linear motors for driving the platforms each having a relatively flat operating curve whereby the thrust varies within a restricted range with variations in speed of the platforms;
   a constant high speed section following the variable speed section and a drive motor for the constant speed section, the motor having a steep operating curve whereby slight variations in speed produce a substantially variable torque output from the motor such that the speed of the said section is maintained substantially constant, the constant speed section controlling the speed of the platforms at the exit end of the variable speed zone.

2. The conveyor of claim 1 in which the platforms are continuously in edge-to-edge contact from the constant speed drive motor back through the variable speed section.

3. A conveyor as claimed in claim 1 wherein the platforms are elongated in plan view and travel in substantially side-by-side relationship.

4. A conveyor as claimed in claim 1 wherein the guide means for the variable speed section defines a curved path, the platforms sliding laterally relative to one another during passage through the variable speed section.

5. A conveyor as claimed in claim 4, the linear motors including stators mounted beneath the platforms and each stator arranged to provide a thrust on the platforms tangential to the curved path in the variable speed section.

6. A conveyor as claimed in claim 5 wherein the stators are in substantially end-to-end relationship.

7. A conveyor as claimed in claim 1, the guide means comprising means for imposing a reaction on the platforms whereby the thrust of the linear motors on each platform can be resolved into a force opposing said reaction and a force acting parallel to the longitudinal axis of the platforms.

8. A conveyor as claimed in claim 1 wherein the variable speed section is an acceleration section.

9. A conveyor as claimed in claim 1 wherein the linear motors are arranged to apply thrust through the center of gravity of each platform.

10. A conveyor as claimed in claim 1, the conveyor comprising a constant speed low speed section; a constant speed high speed section; an intermediate acceleration section and an intermediate deceleration section; wherein locking means are provided for locking the platforms in side-by-side relationship in the constant speed high speed section.

11. A conveyor as claimed in claim 10 including locking means for locking the platforms together in the acceleration section, the locking means permitting relative lateral sliding of the platforms.

12. A conveyor as claimed in claim 10 including locking means for locking the platforms together in the deceleration section, the locking means permitting relative lateral sliding of the platforms.

13. A conveyor as claimed in claim 1, wherein the guide means for guiding the platforms through a variable speed section are arranged to guide the platforms in a parabolic curve whereby a constant acceleration or deceleration is obtained.

* * * * *